United States Patent [19]

Ginsburg

[11] 4,248,646
[45] Feb. 3, 1981

[54] METHOD OF MAKING FOAM FILLED CUSHION TOILET SEAT

[76] Inventor: Milton Ginsburg, 1201 Sandringham Rd., Bala Cynwyd, Pa.

[21] Appl. No.: 52,339

[22] Filed: Jun. 27, 1979

Related U.S. Application Data

[62] Division of Ser. No. 903,884, May 8, 1978, abandoned.

[51] Int. Cl.³ .................. B32B 31/14; B32B 5/20; A47K 13/02
[52] U.S. Cl. .................................. 156/78; 4/234; 4/237; 4/DIG. 8; 156/110 R; 156/245; 156/250; 156/251; 156/285; 264/45.1; 297/DIG. 1; 297/DIG. 2; 428/71; 428/137; 428/315; 428/322
[58] Field of Search ............... 4/134, 185 S, 234, 236, 4/237, 239, 240, DIG. 8; 156/78, 79, 110 R, 245, 251, 285, 250; 297/DIG. 1, DIG. 2; 428/137, 71, 315, 322; 264/45.1, 45.2

[56] References Cited

U.S. PATENT DOCUMENTS

| | | | |
|---|---|---|---|
| 3,639,922 | 2/1972 | Samuels et al. | 4/237 |
| 3,772,111 | 11/1973 | Ginsburg | 156/79 |
| 3,854,150 | 12/1974 | Samuels et al. | 4/237 |
| 3,949,432 | 4/1976 | Ginsburg | 4/237 |

Primary Examiner—William A. Powell
Assistant Examiner—Robert A. Dawson
Attorney, Agent, or Firm—Paul & Paul

[57] ABSTRACT

A cushioned toilet seat, and a method for its manufacture, are disclosed, wherein the cushion material is itself formed and shaped during the process of manufacture. The cushion material comprises polyurethane foam which is formed from a reaction mixture placed within a vacuum-forming mold which is used to shape the seat. The seat is supported by a stiff annular member, and is completely enclosed by suitable soft plastic, which plastic is heat-sealed for sturdy construction. No holes need be made in the seat during the manufacturing process.

4 Claims, 6 Drawing Figures

METHOD OF MAKING FOAM FILLED CUSHION TOILET SEAT

RELATED APPLICATION

This is a divisional application of application Ser. No. 903,884 filed May 8, 1978 and now abandoned.

BACKGROUND OF THE INVENTION

This invention relates to cushioned toilet seats. Such seats are well known in the art, examples of which appear in U.S. Pat. No. 3,949,432 to M. Ginsburg and U.S. Pat. No. 3,639,922 to Samuels et al.

Cushioned toilet seats are becoming increasingly popular, and many different types of construction are known. Typically, the cushion material is made of polyurethane foam, and this foam is surrounded by a layer of soft plastic, such as polyvinyl chloride. Most cushioned toilet seats also contain a stiff supporting member, on which the cushion material rests, and this member may be constructed of wood or of suitable hard plastic.

Although cushioned toilet seats are comfortable to use, they can be expensive to manufacture and are prone to breakage after frequent compression of the cushion, due to excessive pressure within the seat. The expense of manufacture is due to the fact that not only must the outer plastic layer be formed into the proper shape, but also the cushion material must be provided in the shape of an annulus to fit properly within the vacuum mold. Thus, two distinct manufacturing operations have been required, one for the cushion material, and one for the outer layer.

SUMMARY OF THE INVENTION

The cushioned toilet seat which is the subject of the present invention can be manufactured in one simple process. A first layer of soft plastic is forced into an annular mold, by means of suction, and the ingredients of a foamable polyurethane resin reaction mixture is introduced into what is to become the interior of the toilet seat. The reaction mixture produces the desired cushion, quickly filling the space within the mold, while a second layer of soft plastic is placed over said mold. A stiff member, having an annular shape to fit the mold is then placed over the mold followed by a third layer of soft plastic material. All three layers are then heat sealed by a conventional electronic heat sealer, and the excess soft plastic is removed from the seat. While the layers are being placed in position and sealed, the reaction mixture is producing a properly shaped cushion. Thus, there is no need to construct the foam cushion in a separate operation. Also, it is not necessary to insert holes in the seat in order to inject the ingredients of the reaction mixture, because the mixture is inserted before the seat has been enclosed by soft plastic. However, holes may be later added, if desired, to facilitate the escape of air from the interior of the seat. The polyurethane within the seat tends to adhere to the outer soft plastic layer, and tends to strengthen the heat seals. There is thus little danger of the heat seals breaking during use.

Accordingly, it is a primary object of the present invention to provide a cushioned toilet seat comprising layers of soft plastic surrounding an expandable foam cushion.

It is a further object of the present invention to provide a method of making a cushioned toilet seat, wherein the cushion material is formed from a reaction mixture during the assembly of the other components of said toilet seat.

It is a further object of the present invention to provide a method of manufacture of a cushioned toilet seat, which does not require perforation of said seat during the process of supplying foamable cushion material to the interior of the seat.

It is a further object of the present invention to provide a cushioned toilet seat having a stiff interior member which tends to retain and shape the foamable material in the interior of said seat.

It is a further object of the present invention to provide a cushioned toilet seat as described above, wherein the foamable material within said seat tends to strengthen the construction of the seat.

It is a further object of the present invention to provide a method of manufacturing a cushioned toilet seat which is more economical than any other methods which are known in the art.

Other objects and advantages of the present invention will be apparent to those skilled in the art from a reading of the following brief description of the drawings, the detailed description of the invention, and the appended claims.

DETAILED DESCRIPTION OF THE INVENTION

Figure 1:
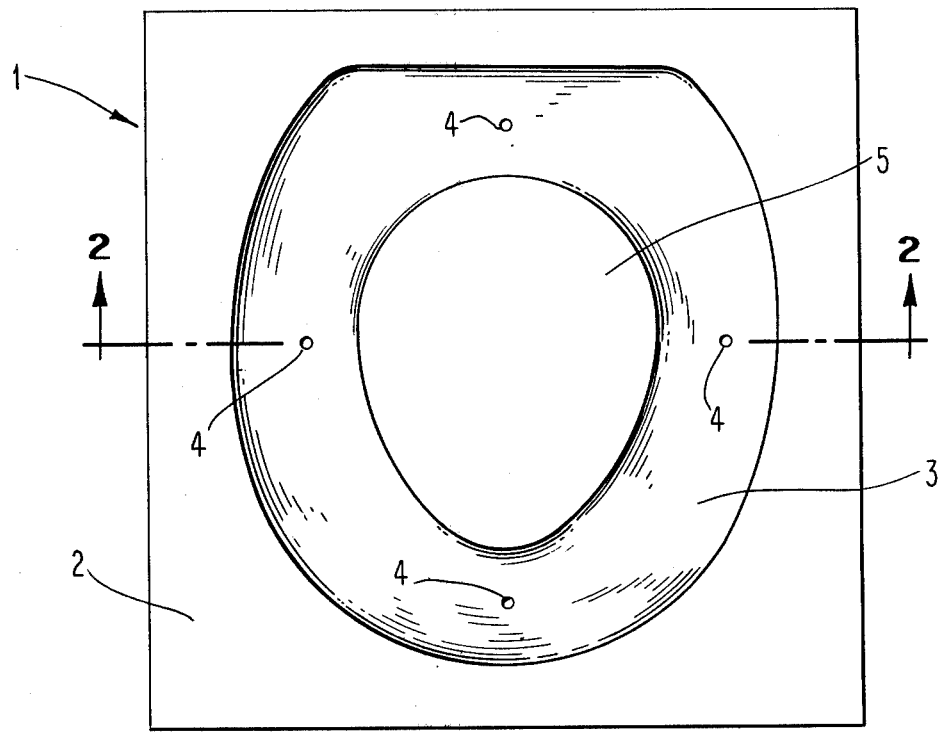
FIG. 1 is a top view of a mold which is used to manufacture the cushioned toilet seat according to the present invention.

In FIG. 1 there is shown a top view of the mold which is used to form the cushioned toilet seat according to the present invention. Mold 1 comprises a frame 2 and a annular recess 3. The shape of recess 3 determines the ultimate shape of the toilet seat. Holes 4 are provided to draw air towards the bottom of mold 1, thereby providing suction for vacuum forming of the outer plastic layer of the cushioned toilet seat.

Figure 2:
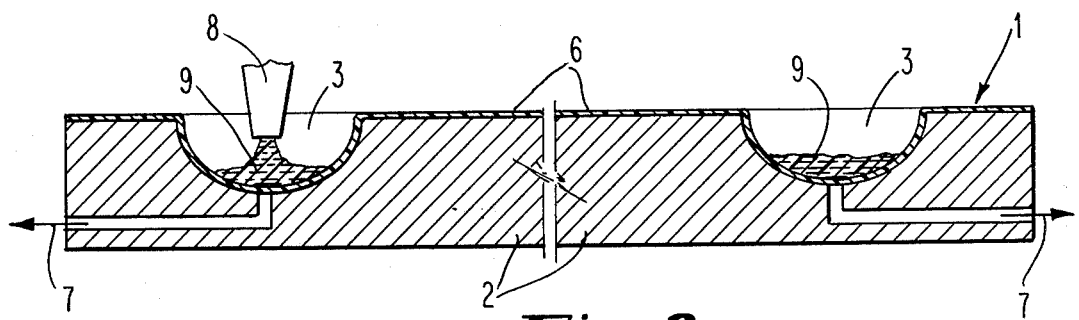
FIG. 2 is a cross-sectional view of the mold, taken along the line 2—2 of FIG. 1, and showing the insertion of the foamable reaction mixture.

The steps of the method disclosed in the present invention are illustrated in FIGS. 2–6. These figures are cross-sectional views, all taken in the direction indicated by the line 2—2 of FIG. 1. A layer of soft plastic material 6 is placed over the mold 1, substantially covering said mold. Layer 6 is vacuum formed in the mold by means of suction, the direction of air flow being indicated by arrows 7. As an aid to this vacuum forming step, the plastic layer may be heated from above, by a suitable heating means, not shown for the sake of clarity. The heat tends to soften the plastic layer 6. Also, as an aid in proper vacuum forming, it is desirable to cut layer 6 at several locations in the region indicated by the numeral 5 in FIG. 1. This cutting allows layer 6 to stretch more easily and naturally into its desired final shape. Layer 6 is typically constructed of polyvinyl chloride, and could be of 18 gauge, or other suitable thickness. Also shown in FIG. 2 is nozzle 8 which is used to insert foamable polyurethane resin reaction mixture 9 into the recess 3. Reaction mixture 9 will ultimately form the foam cushion essential to the cushioned toilet seat. The particular reaction mixture used could vary, but in the preferred embodiment, it is desirable to use any mixture which produces a flexible, homogenous, cellular, molded, polymeric-type polyether foam. As soon as the reaction ingredients are injected into the recess 3, the reaction begins to occur, and the foam begins to expand. The rate of expansion depends on the specific proportions of reaction ingredients used, and these proportions can be varied to accommodate the pace of the manufacturing process. The expanding reaction mixture eventually forces the air out of recess 3.

Figure 3:
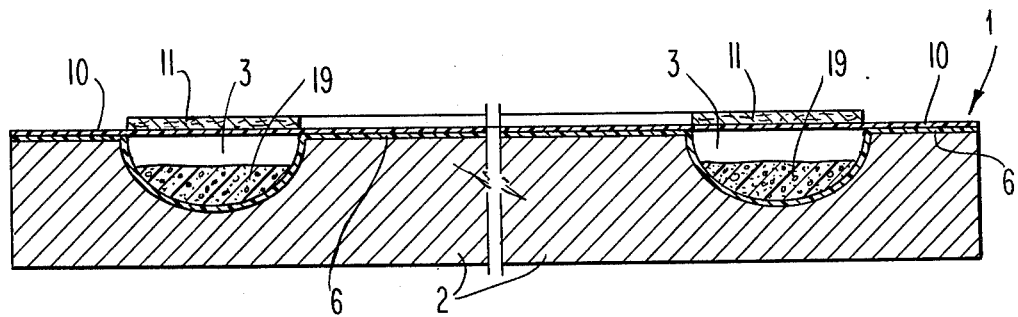
FIG. 3 is a cross-sectional view similar to that of FIG. 2, showing the addition of another plastic layer and a stiff annular member in accordance with the present invention.

While the foam is expanding, another layer of soft plastic 10 is placed over mold 1, as shown in FIG. 3, also substantially covering said mold. Then, a stiff annular member 11 is placed over plastic layer 10. Member 11 provides support for the entire seat, as it is constructed of hard polyvinyl chloride, or wood, or other suitable stiff material. At the same time, plastic layer 10 prevents reaction mixture 9 from squeezing through the edges and sides of stiff member 11. While plastic layer 10 and stiff member 11 are being placed over mold 1, reaction mixture 9 has become a bona fide foam 19, which continues to expand and fill the space defined by recess 3 and plastic layer 10.

Figure 4:
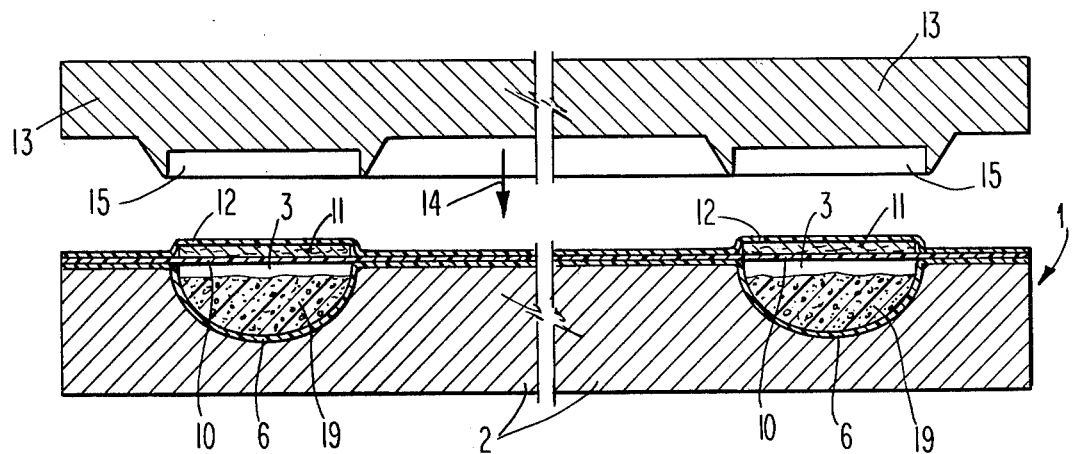
FIG. 4 is a cross-sectional view of the mold, similar to that of FIG. 2, but also including the final layer of plastic material, as well as a view, in cross-section, of a heat sealing means.

The next steps in this process are illustrated in FIG. 4. Outer layer 12 of plastic material is placed over stiff member 11, so as to cover said member, as shown in FIG. 4. Layer 12 is of a size comparable to that of layers 6 and 10. Then, heat sealing die 13, shown in cross-section in FIG. 4, is brought down over mold 1 as indicated by arrow 14. Die 13 contains recess 15 having an annular shape to mate with the protrusion of stiff member 11 and outer layer 12. This mating is clearly illustrated in FIG. 5. Plastic layers 6, 10, and 12 are then heat sealed, according to the well known method of applying a highfrequency alternating current to the material. At the same time, foam 19 has substantially completed its expansion, and is prevented from further expansion by layer 10, as well as the pressure of stiff member 11, and the rigid die 13. The rigidity of member 11 and of die 13 helps to form foam 19 into the desired shape, preventing said foam from expanding uncontrollably. Die 13 is retained in the position shown in FIG. 5 for a brief period, usually about 3–10 seconds, depending upon the thickness of the plastic layers to be sealed, and upon the stage of expansion of foam 19.

Figure 5:
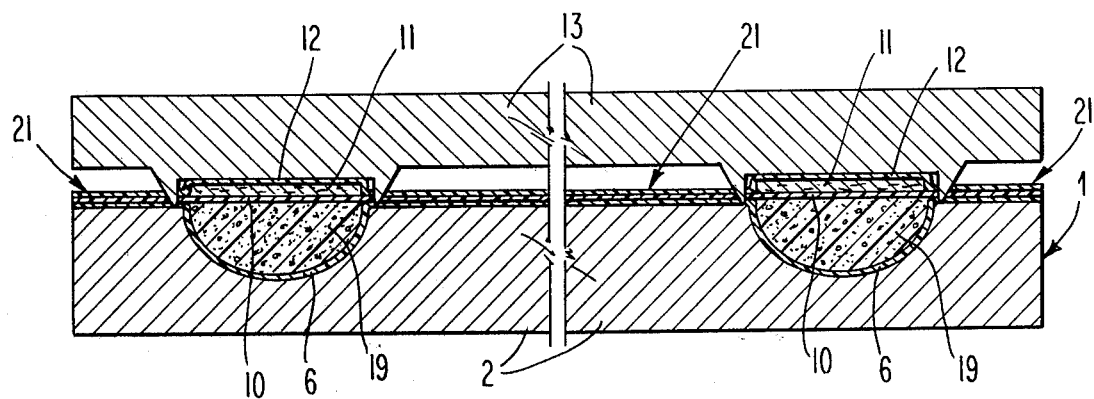
FIG. 5 is another cross-sectional view, showing the heat sealing means in engagement with portions of the cushioned toilet seat.
Figure 6:
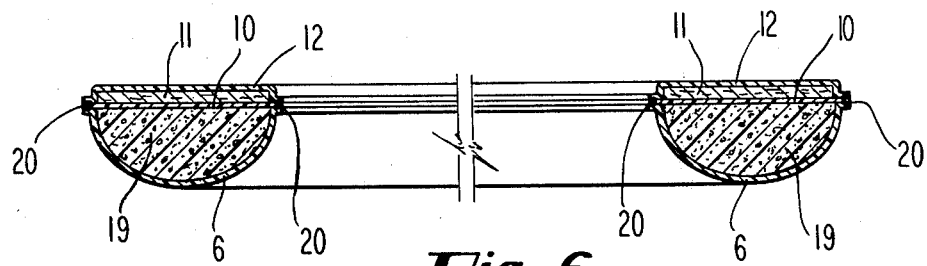
FIG. 6 is another cross-sectional view, taken in a direction similar to that of FIG. 2, showing the product in its final form.

When the die is removed, the final product, in cross-section, appears as shown in FIG. 6. Heat seals 20 now join plastic layers 6, 10, and 12, and the result is essentially one integral soft plastic cover for the cushioned seat. Foam 19 substantially fills the entire space defined by layers 6 and 10, and stiff member 11 continues to provide rigid support. Excess soft plastic, indicated generally by the numeral 21 in FIG. 5, has been removed in the finished product shown in FIG. 6. Note that substantially all the air within the seat has been displaced by the foam, before the heat sealing is performed.

It is seen that the heat sealer itself, as shown in FIG. 5, aids in the direct formation of the seat according to the present invention. Instead of having to form the cushion material separately, all components of the cushioned seat are manufactured in essentially the same operation, and in the same mold. The combination of mold 1 and die 13 is sufficient to manufacture a seat having the desired shape. Thus, by using the method disclosed herein, the extra expense of separately forming a foam cushion is eliminated.

It should be noted that the size and shape of the particular cushioned seat can be easily varied. By changing the circumference of the recess 3, and by changing the depth of mold 1, varying thicknesses can be attained in the cushioned seat as described. Also, varying proportions of reactants in the reaction mixture can be used to control the time during which the foam fills the space in the interior of the seat. In the preferred embodiment of this invention, a proportion is selected such that the foam material has almost completed its expansion when die 13 is applied.

Note that it is not necessary to perforate any of the plastic layers depicted herein, during the manufacture of the cushioned seat. Rather, the reaction mixture is injected before a complete enclosure has been constructed, and only after the mixture is in place is the seat then covered. If it is desired to insert holes for purposes of ventilation of the interior of the seat, these holes can be added later. Also, eyelets can be inserted through stiff member 11 as desired, in accordance with known methods of manufacture.

It is apparent from the foregoing that many modifications are possible within the spirit and scope of the present invention. The embodiment described herein is not to be interpreted as limiting the scope of this invention to the process and product specifically illustrated herein.

What is claimed is:

1. A method of making of a cushion toilet seat comprising the steps of:
    a. vacuum forming an open annular trough in a first soft plastic film material;
    b. placing a foamable reaction mixture in said trough and allowing said mixture to expand in said trough to form a foam cushion material;
    c. placing a second layer of soft plastic film material over said trough containing said expanding foam cushion material before the foam material has expanded sufficiently to fully fill the trough;
    d. laying a stiff annular member over said second layer of soft plastic film material in a position to register with said annular trough;
    e. covering said stiff annular member with a third layer of soft plastic film material;
    f. heat sealing said first, second and third layers of soft plastic film material together at the inner and outer rims of the annular trough before said expanding foam cushion material has fully filled the trough;
    g. tearing away and removing said first, second and third layers of plastic film material within the center region defined by the inner rim of said annular trough; and
    h. tearing away and removing the excess material of said first, second and third layer of plastic film material outside the outer rim of said annular trough.

2. The method of claim 1 wherein said foamable reaction mixture is polyurethane resin.

3. The method of claim 1 wherein said vacuum forming step includes the steps of:
 a. laying a layer of first soft plastic film material over a mold having an annular trough therein;
 b. making at least one slit in said plastic film material within the center region defined by the inner rim of said annular trough to facilitate forming of said first plastic film material in the open annular trough of said mold; and
 c. heating said first plastic film material to soften said material to facilitate forming thereof.

4. The method of claim 1 wherein said heat sealing step comprises high frequency electronic heat sealing.